T. STAFFORD.
PUTTY KNIFE.
APPLICATION FILED JUNE 26, 1917.
1,277,767.
Patented Sept. 3, 1918.
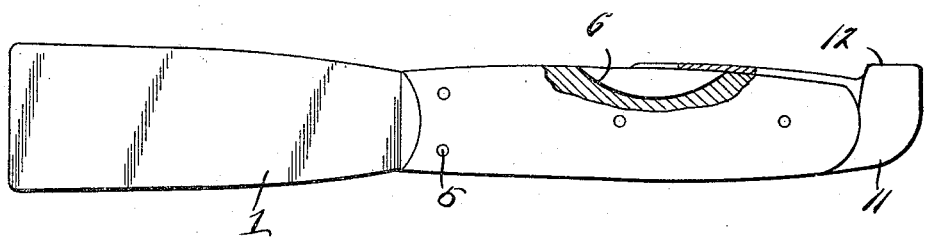
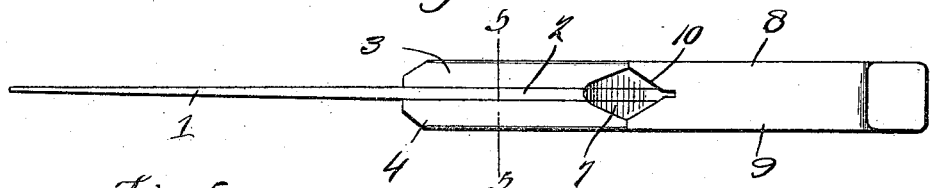
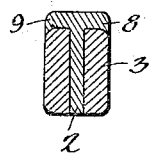
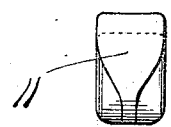
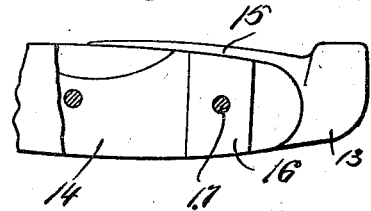
WITNESSES
Chas. E. Kemper.
Lloyd W. Patch
INVENTOR
Ted Stafford
BY Richard Bowen
ATTORNEY

UNITED STATES PATENT OFFICE.

TED STAFFORD, OF GENEVA, NEW YORK.

PUTTY-KNIFE.

1,277,767. Specification of Letters Patent. Patented Sept. 3, 1918.

Application filed June 26, 1917. Serial No. 177,048.

*To all whom it may concern:*

Be it known that I, TED STAFFORD, a citizen of the United States, residing at Geneva, in the county of Ontario and State of New York, have invented certain new and useful Improvements in Putty-Knives, of which the following is a specification.

This invention relates to improvements in a putty knife, and more particularly to a handle structure for such tools.

When painters and decorators are at work, it is a practice to use the blade of a putty knife to extract or pry out tacks and small nails, and to use the handle in driving in nails which cannot be thus extracted, however, where these practices are indulged in, the blade of the knife is often chipped or broken, and almost invariably the handle is chipped and loosened; and, with these facts in mind, it is the purpose of my invention to provide a handle structure for a putty knife which is of such character that a claw portion is provided to be used in pulling tacks and small nails, while a hammer portion is provided to be used in driving in larger nails.

A further object lies in embodying the parts above-mentioned with the handle in such a way that the handle is not made clumsy or cumbersome to the grip and is not unduly weighted.

Yet another object is to so form the claw and hammer portions that the novel structure may be embodied at a low cost of material and workmanship.

With the above and other objects in view which will be in part described and in part understood from the specification, drawings, and claims, my invention consists of certain novel features of construction and combinations of parts which will be hereinafter more fully set forth.

In the drawings:—

Figure 1 is a view in elevation of a knife, constructed after the manner of my invention, and with parts in section more clearly to illustrate the manner of construction;

Fig. 2 is an edge view of the disclosure in Fig. 1;

Fig. 3 is an end view looking at the butt end of the handle;

Fig. 4 is a fragmentary view with parts broken away and illustrating a somewhat modified form of construction; and Fig. 5 is a sectional view taken on line 5—5 of Fig. 2.

The blade 1 is made to be of any desired shape and has a shank 2 extended to form a support for the handle members 3 and 4 which are secured on the shank by means of rivets 5.

Thus far the parts can be exactly of standard form and design with the exception that the shank portion 2 of the blade 1 is notched as shown at 6, and the handle members 3 and 4 are correspondingly notched as indicated at 7, to thus provide a recess centrally and on one side of the handle. The shank portion 2 is provided upon one edge thereof with a pair of laterally extending flanges 8 and 9, which flanges 8 and 9 overhang the handle members 3 and 4 as shown in Fig. 5. The under faces of these flanges 8 and 9 are shaped to conform to the contour of the handle members. The flanges 8 and 9 project forwardly and extend over the handle members as far as the notched portions 6 and 7 of the handles and shank, as shown clearly in Figs. 1 and 2 of the drawings. These flanges 8 and 9 are notched as indicated at 10 for constituting a claw for extracting tacks and the like. At the butt end of the shank, a widened out knob or head 11 is provided, and this knob or head is made flat on the surface 12 for a hammer portion. It will of course be understood that the knob or head 11 and the flanges 8 and 9, will be so designed as to fit and conform closely to the outlines of the handle and thus the handle is not made cumbersome, nor does the provision of the knob or head 11 unduly weight the handle, as the weight is so placed as to properly balance when the knife is held in the hand for use.

In Fig. 4 I have shown a slightly modified form of the invention in which the knob or head 13 is made as a part independent and free of any attachment to the shank 14, and in lieu of the flanges 8 and 9, a plate-like extension 15 is provided which is shaped to lie against the edge of the handle and the shank 14, and has the end thereof projecting over the recess provided in the handle, it of course being understood that this end will have the jaw formed therein. A lug 16 is provided on the inner side of the plate 15 slightly to one side of the center and so disposed that when the head 13 and the plate 15 are fitted into the proper position in the handle the lug will lie against the side of the shank 14. It will of course be understood that the handle member lying against the side of a shank upon which the lug 16 is disposed will be shaped to fit thereover, then as the handle securing rivet 17 is fitted and clenched in place, the structure which is virtually an attachment will be held securely in place.

From the foregoing it will be seen that I have provided a handle structure for a putty knife which is of such character that a claw and a hammer portion are embodied therein without materially altering the contour of the handle and that the weight of the parts is so distributed that the knife is balanced.

While I have herein shown and described only one specific form and arrangement of the structure, it will of course be appreciated that the disposition of the jaw and also the knob or head portion might be varied somewhat to suit the exact position of use to adapt the same to particular forms of handles, that the head or knob portion might be dispensed with and the flanges 8 and 9 or the plate portion 15 be depended upon for use in driving tacks, nails, and the like, and that still other changes might be resorted to, in view of which fact I wish to be limited only to such points as may be set forth in the claims.

I claim:—

1. A tool comprising a handle portion having a shank therein, which parts are notched out at one side, a plate-like formation on the side of the handle portion which is notched and extended and formed to present a claw formation extending in part over the notch, and means to secure the shank and the plate-like portion in conjunction with said handle.

2. A tool comprising a handle portion having one side thereof notched out, a plate-like formation on that side of the handle portion which is notched out and extended to present a claw formation extending in part over the notch, means by which the plate-like formation is carried within the handle, and means passing through the handle and through said last-mentioned means to secure and rigidly mount the plate-like portion in conjunction with the handle.

3. A tool of the class described comprising a handle portion provided with a notch formed in one side thereof, a shank extending through said handle portion, said shank provided with a pair of laterally extending flanges along one edge thereof, said flanges overhanging said handle portion, said flanges also projecting over and overhanging said notched portion and being reinforced by said shank portion, and said overhanging portion of said flanges provided with a tack-engaging means for facilitating the withdrawal of a tack by means of said flanges.

4. A tool of the class described comprising a handle portion provided with a notch formed in one side thereof, a shank extending through said handle, a plate-like portion secured to said shank and overhanging one side of said handle and shank, said plate-like portion and shank provided with a projecting fulcrum portion extending beyond said handle, and article-engaging means formed upon said plate-like portion and overhanging said notch for facilitating the withdrawal of a tack from engagement with a support.

In testimony whereof I affix my signature in presence of two witnesses.

TED STAFFORD.

Witnesses:
DANIEL KANE,
Mrs. GREENWOOD.

Copies of this patent may be obtained for five cents each, by addressing the "Commissioner of Patents, Washington, D. C."